United States Patent
Macher

[11] 3,922,070
[45] Nov. 25, 1975

[54] HIGH-SPEED VARIFOCAL OBJECTIVE

[75] Inventor: Karl Macher, Bad Kreuznach, Germany

[73] Assignee: Jos. Schneider & Co. Optische Werke, Bad Kreuznach, Rhineland, Germany

[22] Filed: Oct. 9, 1974

[21] Appl. No.: 513,257

[30] Foreign Application Priority Data
Oct. 10, 1973 Germany............................ 2350829

[52] U.S. Cl.................................. 350/184; 350/214
[51] Int. Cl.²................................................. G02B 15/16
[58] Field of Search............................. 350/184, 186

[56] References Cited
UNITED STATES PATENTS
3,707,324  12/1972  Macher.............................. 350/184
3,820,876  6/1974  Macher.............................. 350/184

Primary Examiner—John K. Corbin
Attorney, Agent, or Firm—Karl F. Ross; Herbert Dubno

[57] ABSTRACT

A varifocal objective comprising an afocal front group of adjustable focal length with a fixed positive first component, a movable negative second component, a movable negative third component and a fixed positive fourth component, preceding a fixed-focus rear group, has a varifocal ratio of 3:1 or 4:1 with a relative aperture of 1:1.8. The individual focal lengths $f_I$, $f_{II}$, $f_{III}$, $f_{IV}$ of the four components of the front group are related to the focal length $f_V$ of the rear group in substantially the ratios $f_I/f_V = +3.1$, $f_{II}/f_V = -1.6$, $f_{III}/f_V = -1.9$ and $f_{IV}/f_V = +2.0$.

6 Claims, 4 Drawing Figures

HIGH-SPEED VARIFOCAL OBJECTIVE

FIELD OF THE INVENTION

My present invention relates to a varifocal objective with an afocal front lens group of adjustable focal length and a rear lens group of fixed focal length, the front group consisting of a substantially fixed positive first component, axially shiftable negative second and third components, and a fixed positive fourth component. The term "substantially fixed," as applied to the first component, is meant to allow for a certain adjustability of that component or one of its members for focusing purposes.

BACKGROUND OF THE INVENTION

Varifocal objectives of this general type have been disclosed, for example, in my prior U.S. Pat. Nos. 3,707,324 and 3,820,876. These objectives, with relative apertures of 1:1.8, have large varifocal ratios of up to 11:1; in each instance, both the fixed first component and the movable second component of the front group consist of several air-spaced lens members.

OBJECT OF THE INVENTION

The object of my present invention is to provide a simplified objective system of this type, with the same relative aperture of 1:1.8, wherein the second component consists of a single lens member and which exhibits a high optical quality throughout a varifocal range of up to 4:1.

SUMMARY OF THE INVENTION

I realize this object by so choosing the individual focal lengths $f_I$, $f_{II}$, $f_{III}$ and $f_{IV}$ of the four components of the front group, in relation to the fixed focal length $f_V$ of the rear group, that the ratios thereof have substantially the following numerical values:

TABLE O

| | | |
|---|---|---|
| $f_I/f_V$ | = | +3.1 |
| $f_{II}/f_V$ | = | −1.6 |
| $f_{III}/f_V$ | = | −1.9 |
| $f_{IV}/f_V$ | = | +2.0 |

The positively refracting first component consists of three lens members, i.e., a negative first lens member followed by positive second and third lens members, all the other components of the front group being constituted by single lens members. The rear group is preferably composed of four single lenses as known per se.

In such a system, all the lens members of the front groups with the possible exception of the second component can also be singlets. If the second component is likewise a singlet, a varifocal ratio of 3:1 is realizable; if it is a doublet, the range can be extended to a ratio of 4:1.

BRIEF DESCRIPTION OF THE DRAWING

My invention will now be described in greater detail with reference to the accompanying drawing in which.

SPECIFIC DESCRIPTION

Figure 1:
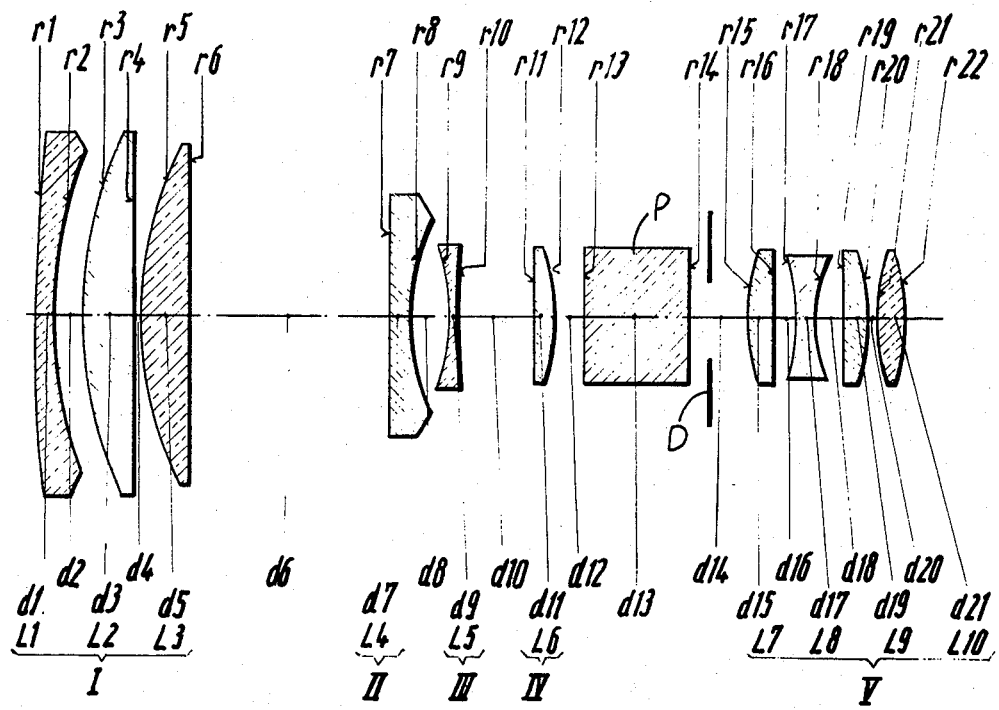
FIG. 1 diagrammatically illustrates an embodiment with a varifocal ratio of 3:1.

The objective system shown in FIG. 1 comprises a front group with four components I, II, III and IV as well as a rear group V, the two groups being separated from each other by an axial distance large enough to accommodate a prism P followed by a diaphragm D. Prism P may have an internal semireflective surface, not shown, for directing some of the incident light ahead of the diaphragm onto a non-illustrated viewfinder as is well known in the art.

The substantially fixed, positively refracting first component I of the front group consists of three airspaced lenses, i.e., a negative meniscus L1, a biconvex lens L2 and a nearly planoconvex positive meniscus L3. The axially shiftable second component II is a single lens L4 in the shape of a negative meniscus. A biconcave lens L5 constitutes the axially shiftable negative third component III. The positive and axially fixed fourth component IV is again a single lens L6 of biconvex shape. The members of rear lens group V are a biconvex lens L7, a biconcave lens L8 and two further biconvex lenses L9 and L10.

The system shown in FIG. 1 has a relative aperture of 1:1.8 and a back-focal length of 15.22 mm. Representative numerical calues of the radii $r1$ –$r22$ of the lenses L1 – L10 and prism P, their thicknesses and separations $d1$ –$d21$, their refractive indices $n_e$ and their Abbe numbers $\nu_e$ are given in the following Table I, these values being of course subject to certain tolerances; in particular, the decimal values of the radii and the lower decimals of the refractive indices (beginning with the third decimal) are of minor significance. The Table also shows the individual surface powers $\Delta n/r$.

TABLE I

| | | | | | | | | $n_e$ | $\nu_e$ | $\Delta n/r$ |
|---|---|---|---|---|---|---|---|---|---|---|
| | | | r1 | = | + | 161.60 | | | | + 0.00471330 |
| | L1 | | | | | | d1 | = | 1.80 | 1.76167 27.4 |
| | | | r2 | = | + | 38.01 | d2 | = | 2.50 | airspace | − 0.02003867 |
| | L2 | | r3 | = | + | 41.27 | d3 | = | 4.70 | 1.60994 56.4 | + 0.01477925 |
| I | | | r4 | = | − | 550.50 | d4 | = | 0.10 | airspace | + 0.00110797 |
| | L3 | | r5 | = | + | 33.99 | d5 | = | 3.80 | 1.62509 52.9 | + 0.01839040 |
| | | | r6 | = | + | 308.20 | d6 | = | 16.05 | airspace(variable) | − 0.00202819 |
| II | L4 | | r7 | = | + | 700.00 | d7 | = | 2.00 | 1.60548 60.4 | + 0.00086497 |
| | | | r8 | = | + | 17.11 | d8 | = | 3.71 | airspace(variable) | − 0.03533749 |
| III | L5 | | r9 | = | − | 19.53 | d9 | = | 1.00 | 1.48914 70.2 | − 0.02504557 |
| | | | r10 | = | + | 120.02 | d10 | = | 6.54 | airspace(variable) | − 0.00407548 |
| IV | L6 | | r11 | = | + | 224.40 | d11 | = | 1.80 | 1.79180 25.9 | + 0.00352852 |
| | | | r12 | = | − | 32.02 | d12 | = | 2.50 | airspace | + 0.02472829 |
| | | | r13 | = | | ∞ | d13 | = | 9.00 | 1.51872 64.0 | 0 |
| | | | r14 | = | | ∞ | d14 | = | 4.80 | airspace | 0 |
| | L7 | | r15 | = | + | 14.01 | d15 | = | 2.30 | 1.62509 52.9 | + 0.04461741 |
| | | | r16 | = | − | 190.50 | d16 | = | 1.80 | airspace | + 0.00328131 |
| | L8 | | r17 | = | − | 16.81 | d17 | = | 2.10 | 1.79180 25.9 | − 0.04710291 |

TABLE I-continued

|   |     |     |   |       |     |   | $n_e$ | $v_e$ | $\Delta n/r$ |
|---|-----|-----|---|-------|-----|---|-------|-------|--------------|
| V | | r18 | = + | 17.94 | d18 | = | 1.65 | airspace | − 0.04413600 |
| | L9 | r19 | = + | 45.04 | d19 | = | 2.60 | 1.62286  60.1 | + 0.01382904 |
| | | r20 | = − | 15.87 | d20 | = | 0.80 | airspace | + 0.03924763 |
| | L10 | r21 | = + | 27.81 | d21 | = | 2.00 | 1.62286  60.1 | + 0.02239697 |
| | | r22 | = − | 31.06 | | | | | + 0.02005344 |
| | | | | | $\Sigma d$ | = | 73.55 | | |

The three variable airspaces $d6$, $d8$ and $d10$ are given in Table I for a median position corresponding to an overall focal length $f = 20$ mm. Other values of these airspaces and corresponding focal lengths $f$ are given in the following Table IA.

TABLE IA

| f | d6 | d8 | d10 |
|---|----|----|-----|
| 10.4 | 1.11 | 15.24 | 9.95 |
| 14.0 | 8.46 | 8.78 | 9.06 |
| 18.0 | 13.95 | 4.87 | 7.48 |
| 21.0 | 16.97 | 3.28 | 6.04 |
| 26.0 | 20.69 | 2.21 | 3.40 |
| 30.0 | 22.84 | 2.27 | 1.19 |

Figure 3:
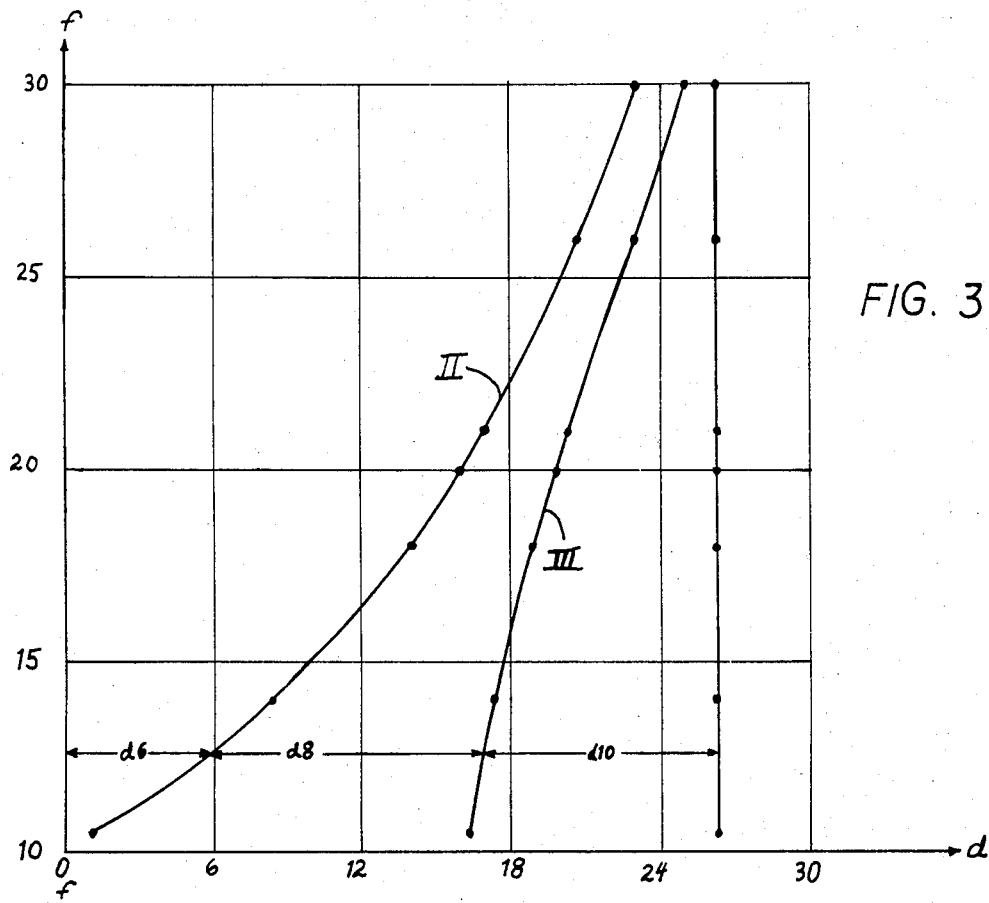
FIGS. 3 and 4 are graphs showing the relative positions of the movable components of FIGS. 1 and 2, respectively.

It will thus be seen that the system of FIG. 1 has a varifocal ratio of about 3:1, with $f_{min} \approx 10$ mm and $f_{max} \approx 30$ mm. FIG. 1 shows it in its position of maximum focal length; FIG. 3 illustrates diagrammatically the relative positions of the two movable components II and III throughout the range of adjustment.

The individual focal lengths $f_I - f_V$ of components I – V are given in the following Table IB:

TABLE IB

| | | |
|---|---|---|
| $f_I$ | = | +54.991 mm |
| $f_{II}$ | = | −28.998 mm |
| $f_{III}$ | = | −34.258 mm |
| $f_{IV}$ | = | +35.499 mm |

TABLE IB-continued

| | | |
|---|---|---|
| $f_V$ | = | +17.795 mm |

It will be seen that these values approximately satisfy the relationships given in Table 0.

Figure 2:
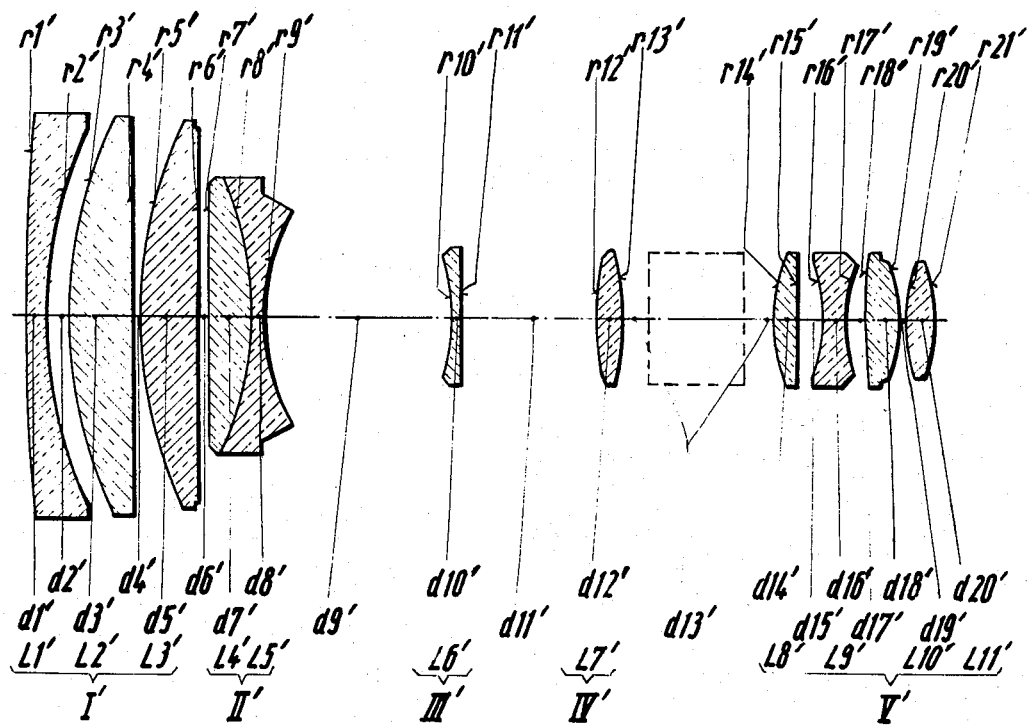
FIG. 2 is a similar diagram of an embodiment with a varifocal ratio of 4:1.

In FIG. 2 I have shown a modified objective according to the invention which is generally similar to that of FIG. 1, with a substantially fixed positive first component I′, movable negative second and third components II′ and III′, a fixed positive component IV′ and a rear lens group V′. Here, too, component I′ consists of three lenses L1′ – L3′, the first lens L1′ being again a negative meniscus whereas lenses L2′ and L3′ are of biconvex shape (with lens L3′ nearly planoconvex). Component II′ is a doublet consisting of a positive meniscus L4′ cemented onto a biconcave lens L5′. Component III′ is a biconcave lens L6′ whereas component IV′ is a biconvex lens L7′. Component V′ consists of four single lenses L8′ – L11′ similar to lenses L7 – L10 in FIG. 1. The position of a prism (P in FIG. 1) has been indicated in broken lines.

The system of FIG. 2 has a relative aperture of 1:1.8 and a back-focal length of 15.18 mm. Representative numerical values of the radii $r1' - r21'$ of its lenses L1′ – L11′, their thicknesses and separations $d1' - d20'$, their refractive indices $n_e$ and their Abbe numbers $v_e$ are given in the following Table II, together with the surface powers $\Delta n/r$; it will be understood that the same tolerances apply as in the case of TAble I.

TABLE II

|    |     |       |     |         |      |   |       |       |              |
|----|-----|-------|-----|---------|------|---|-------|-------|--------------|
|    |     |       |     |         |      |   | $n_e$ | $v_e$ | $\Delta n/r$ |
| I′ | L1′ | r1′ | = + | 224.80 | d1′ | = | 1.80 | 1.76167  27.4 | +0.00338821 |
|    |     | r2′ | = + | 37.67  | d2′ | = | 2.50 | airspace | −0.02021953 |
|    | L2′ | r3′ | = + | 45.13  | d3′ | = | 4.90 | 1.62541  56.6 | +0.01385796 |
|    |     | r4′ | = − | 477.50 | d4′ | = | 0.10 | airspace | −0.00130975 |
|    | L3′ | r5′ | = + | 35.32  | d5′ | = | 5.20 | 1.62509  52.9 | +0.01769790 |
|    |     | r6′ | = − | 1875.00 | d6′ | = | 16.06 | airspace(variable) | +0.00033338 |
| II′ | L4′ | r7′ | = − | 286.80 | d7′ | = | 3.10 | 1.76167  27.4 | −0.00265575 |
|    | L5′ | r8′ | = − | 31.95  | d8′ | = | 1.00 | 1.62286  60.1 | −0.00434460 |
|    |     | r9′ | = + | 16.33  | d9′ | = | 4.59 | airspace(variable) | −0.03814206 |
| III′ | L6′ | r10′ | = − | 18.55 | d10′ | = | 1.00 | 1.52583  51.2 | −0.02834663 |
|    |     | r11′ | = + | 428.00 | d11′ | = | 9.75 | airspace(variable) | −0.00122857 |
| IV′ | L7′ | r12′ | = + | 60.13  | d12′ | = | 1.80 | 1.69416  31.0 | +0.01154432 |
|    |     | r13′ | = − | 43.75  | d13′ | = | 14.30 | airspace | +0.01586651 |
| V′ | L8′ | r14′ | = + | 14.01 | d14′ | = | 2.30 | 1.62509  52.9 | +0.04461741 |
|    |     | r15′ | = − | 190.50 | d15′ | = | 1.80 | airspace | +0.00328131 |
|    | L9′ | r16′ | = − | 16.81 | d16′ | = | 2.10 | 1.79180  25.9 | −0.04710291 |
|    |     | r17′ | = + | 17.94 | d17′ | = | 1.65 | airspace | −0.04413600 |

TABLE II-continued

|   |   |   |   |   |   | $n_e$ | $\nu_e$ | $\Delta n/r$ |
|---|---|---|---|---|---|---|---|---|
| L10' | r18' | = + | 45.04 | | | | | +0.01382904 |
| | | | | d18' = | 2.60 | 1.62286 | 60.1 | |
| | r19' | = – | 15.87 | | | | | +0.03924763 |
| | | | | d19' = | 0.80 | airspace | | |
| L11' | r20' | = + | 25.50 | | | | | +0.02442588 |
| | | | | d20' = | 2.00 | 1.62286 | 60.1 | |
| | r21' | = – | 34.72 | | | | | +0.01793951 |
| | | | | Σd = | 79.35 | | | |

The variable airspaces d6', d9' and d11' are again given for a median position, here corresponding to an overall focal length $f = 18$ mm, but have been shown in FIG. 2 for a position of minimum focal length. Other values of these airspaces for different focal lengths $f$ are given in Table IIA below:

TABLE IIA

| f | d6' | d9' | d11' |
|---|---|---|---|
| 9.35 | 1.15 | 17.02 | 12.23 |
| 15.0 | 12.35 | 7.11 | 10.94 |
| 21.0 | 18.93 | 3.12 | 8.35 |
| 30.0 | 24.48 | 2.30 | 3.62 |
| 35.0 | 26.36 | 3.10 | 0.95 |

Figure 4:
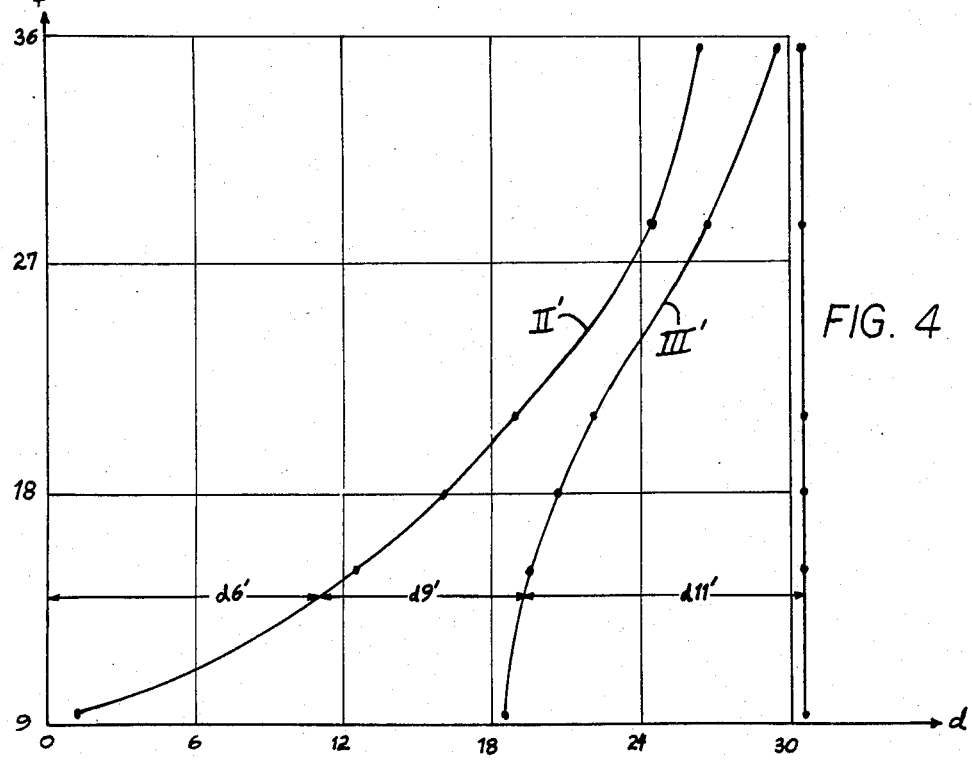

The varifocal ratio here is about 4:1, with $f_{min} \approx 9$ mm and $f_{max} \approx 36$ mm. The positions of the movable components II' and III' throughout the range of adjustment have been indicated schematically in FIG. 4.

The individual focal lengths $f_I - f_V$ in the system of Table II are as follows:

TABLE IIB

| | | |
|---|---|---|
| $f_I$ | = | +56.068 mm |
| $f_{II}$ | = | –27.344 mm |
| $f_{III}$ | = | –33.786 mm |
| $f_{IV}$ | = | +36.742 mm |
| $f_V$ | = | +17.800 mm |

The foregoing values, again, substantially satisfy the relationships of Table 0.

In the system of FIG. 1 the diameter of front lens L1 can be made less than four times the image diagonal; in the system of FIG. 2 the diameter of front lens L1' can be made less than four times the image diagonal.

I claim:

1. A varifocal objective comprising an afocal front lens group of adjustable focal length and a rear lens group of fixed focal length, said front lens group consisting of:
   a substantially fixed first component of positive individual focal length $f_I$ with a negatively refracting first lens member, a positively refracting second lens member and a positively refracting third lens member;
   an axially shiftable second component of negative individual focal length $f_{II}$ constituted by a single fourth lens member;
   an axially shiftable third component of negative individual focal length $f_{III}$ constituted by a single forth lens member; and
   a fixed fourth component of positive individual focal length $f_{IV}$ constituted by a single sixth lens member;
   the individual focal lengths of said components being related to said fixed focal length $f_V$ substantially as follows:

| | | |
|---|---|---|
| $f_I/f_V$ | = | +3.1 |
| $f_{II}/f_V$ | = | –1.6 |
| $f_{III}/f_V$ | = | –1.9 |
| $f_{IV}/f_V$ | = | +2.0 |

2. A varifocal objective as defined in claiam 1 wherein at least said first, second, third, fifth and sixths lens members are singlets.

3. A varifocal objective as defined in claim 2 wherein said fourth lens member is also a singlet and wherein the radii of curvature r1 –r12 of said first lens member L1, said second lens member L2, said third lens member L3, said fourth lens member L4, said fifth lens member L5 and said sixth lens member L6, their thicknesses and separations d1 –d11, their refractive indices $n_e$ and their Abbe numbers $\nu_e$ are substantially as given in the following Table:

| | | | | $n_e$ | $\nu_e$ |
|---|---|---|---|---|---|
| I | L1 | r1 = + 162 | d1 = 1.80 | 1.76 | 27.4 |
| | | r2 = + 38 | d2 = 2.50 | airspace | |
| | L2 | r3 = + 41 | d3 = 4.70 | 1.61 | 56.4 |
| | | r4 = – 551 | d4 = 0.10 | airspace | |
| | L3 | r5 = + 34 | d5 = 3.80 | 1.63 | 52.9 |
| | | r6 = + 308 | d6 =16.05 | airspace(variable) | |
| II | L4 | r7 = + 700 | d7 = 2.00 | 1.61 | 60.4 |
| | | r8 = + 17 | d8 = 3.71 | airspace(variable) | |
| III | L5 | r9 = – 20 | d9 = 1.00 | 1.49 | 70.2 |
| | | r10 = + 120 | d10 = 6.54 | airspace(variable) | |
| IV | L6 | r11 = + 224 | d11 = 1.80 | 1.80 | 25.9 |
| | | r12 = – 32. | | | |

4. A varifocal objective as defined in claim 3 wherein said rear lens group consists of a seventh lens member L7, an eighth lens member L8, a ninth lens member L9 and a tenth lens member L10 with radii of curvature r 15 –r22, thicknesses and separations d15 –d21, refractive indices $n_e$ and Abbe numbers $\nu_e$ substantially as given in the following Table:

| | | | $n_e$ | $\nu_e$ |
|---|---|---|---|---|
| V | L7 | r15 = + 14 | d15 = 2.30 | 1.63 52.9 |
| | | r16 = –191 | d16 = 1.80 | airspace |
| | L8 | r17 = – 17 | d17 = 2.10 | 1.79 25.9 |
| | | r18 = + 18 | d18 = 1.65 | airspace |
| | L9 | r19 = + 45 | d19 = 2.60 | 1.62 60.1 |
| | | r20 = – 16 | d20 = 0.80 | airspace |

-continued

|  |  |  | $n_e$ | $\nu_e$ |
|---|---|---|---|---|
| L10 | r21 = 28 | d21 = 2.00 | 1.62 | 60.1 |
|  | r22 = − 31. |  |  |  |

5. A varifocal objective as defined in claim 2 wherein said fourth lens member is a doublet and wherein the radii of curvature $r1'-r13'$ of said first lens member L1', said second lens member L2', said third lens member L3', lenses L4' and L5' of said fourth lens member, said fifth lens member L6' and said sixth lens member L7', their thicknesses and separations $d1'-d12'$, their refractive indices $n_e$ and their Abbe numbers $\nu_e$ are substantially as given in the following Table:

|  |  |  |  | $n_e$ | $\nu_e$ |
|---|---|---|---|---|---|
| I' | L1' | r1' = +225 | d1' = 1.80 | 1.76 | 27.4 |
|  |  | r2' = + 38 | d2' = 2.50 | airspace |  |
|  | L2' | r3' = + 45 | d3' = 4.90 | 1.63 | 56.6 |
|  |  | r4' = −478 | d4' = 0.10 | airspace |  |
|  | L3' | r5' = + 35 | d5' = 5.20 | 1.63 | 52.9 |
|  |  | r6' =−1875 | d6' = 16.06 | airspace(variable) |  |
| II' | L4' | r7' = −287 | d7' = 3.10 | 1.76 | 27.4 |
|  |  | r8' = − 32 | d8' = 1.00 | 1.62 | 60.1 |
|  | L5' | r9' = + 16 | d9' = 4.59 | airspace(variable) |  |

-continued

|  |  |  | $n_e$ | $\nu_e$ |
|---|---|---|---|---|
| III' | L6' | r10' = − 19 | d10' = 1.00 | 1.53 | 51.2 |
|  |  | r11' = +428 | d11' = 9.75 | airspace(variable) |  |
| IV' | L7' | r12' = + 60 | d12' = 1.80 | 1.70 | 31.0 |
|  |  | r13' = − 44. |  |  |  |

6. A varifocal objective as defined in claim 5 wherein said rear lens group consists of a seventh lens member L8', an eighth lens member L9', a ninth lens member L10' and a tenth lens member L11' with radii of curvature $r14'-r21'$, thicknesses and separations $d14'-d20'$, refractive indices $n_e$ and Abbe numbers $\nu_e$ substantially as given in the following Table:

|  |  |  |  | $n_e$ | $\nu_e$ |
|---|---|---|---|---|---|
| V' | L8' | r14' = + 14 | d14' = 2.30 | 1.63 | 52.9 |
|  |  | r15' = −191 | d15' = 1.80 | airspace |  |
|  | L9' | r16' = − 17 | d16' = 2.10 | 1.79 | 25.9 |
|  |  | r17' = + 18 | d17' = 1.65 | airspace |  |
|  | L10' | r18' = 45 | d18' = 2.60 | 1.62 | 60.1 |
|  |  | r19' = − 16 | d19' = 0.80 | airspace |  |
|  | L11' | r20' = 26 | d20' = 2.00 | 1.62 | 60.1 |
|  |  | r21' = − 35. |  |  |  |

* * * * *